United States Patent [19]
Lee

[11] Patent Number: 5,088,018
[45] Date of Patent: Feb. 11, 1992

[54] OVERVOLTAGE PROTECTION POWER SUPPLY CIRCUIT

[75] Inventor: Chang-heum Lee, Anyang, Rep. of Korea

[73] Assignee: Samsung Electronics Co., Ltd., Kyunggi, Rep. of Korea

[21] Appl. No.: 548,558

[22] Filed: Jul. 5, 1990

[30] Foreign Application Priority Data

Feb. 22, 1990 [KR] Rep. of Korea .............. 90-2243

[51] Int. Cl.$^5$ ........................................ H02M 7/5383
[52] U.S. Cl. ................................. 363/56; 323/276; 361/18
[58] Field of Search ............... 363/55, 56; 323/275, 323/276, 242, 243; 361/18, 91

[56] References Cited

U.S. PATENT DOCUMENTS

| | | | |
|---|---|---|---|
| 3,714,511 | 1/1973 | Fendrich, Jr. ................. | 361/59 |
| 3,893,006 | 7/1975 | Algeri et al. ................. | 361/227 |
| 4,035,710 | 7/1977 | Joyce ........................... | 363/37 |
| 4,336,563 | 6/1982 | Suzuki ........................... | 361/93 |

Primary Examiner—William H. Beha, Jr.
Assistant Examiner—Bruce Dunn
Attorney, Agent, or Firm—Cushman, Darby & Cushman

[57] ABSTRACT

An overvoltage protection power supply circuit for preventing an overvoltage from being applied directly to the flat panel display elements when the overvoltage is induced by a power supply, said overvoltage protection power supply circuit comprising a voltage regulating circuit for receiving an unregulated DC voltage and outputting a regulated DC voltage; a DC to AC voltage converting circuit for receiving the regulated DC voltage and converting the same to an AC voltage for driving flat panel display elements; a rectifying circuit for rectifying the output voltage of said inverting circuit; an overvoltage check circuit for identifying the existence of an overvoltage condition; and a switching circuit for determining a voltage on an adjusting terminal of said voltage regulating means, said switching circuit being controlled by said overvoltage check means whereby the output voltage from said DC to AC voltage converting circuit is fedback to said adjusting terminal of said voltage regulating means via said rectifying circuit, said overvoltage check circuit and said switching circuit.

4 Claims, 2 Drawing Sheets

OVERVOLTAGE PROTECTION POWER SUPPLY CIRCUIT

BACKGROUND OF THE INVENTION

1. Field of the Invention

The present invention relates to an overvoltage protection power supply circuit, and more particularly to an overvoltage protection power supply circuit for protecting a flat panel display element of the type installed in laptop type computer systems and the like, such as a PDP (Plasma Display Panel), LCD (Liquid Crystal Display), CCFT (Cold Cathode Fluorescent Tube) or El display (Electroluminescence display), from an overvoltage occurring in the power supply therefor.

2. Description of the Related Art

Generally, existing overvoltage protection power supply circuits for preventing an overvoltage from being applied to a flat panel display element were inadequate. Such overvoltage protection circuits are employed in laptop type computer systems and the like, which require considerably high AC voltage. The overvoltage protection circuit protects the display elements from overvoltage.

Conventionally, the prior overvoltage protection power supply circuits for flat panel display elements were made up of a voltage regulator for outputting regulated DC voltage from an unregulated DC voltage applied to the input terminal, a DC to AC converter for outputting AC voltage from a DC input voltage applied thereto (for example by use of a Hartly Oscillator), and a circuit for removing an overvoltage when the AC output voltage output from the converter is higher than a predetermined voltage. The overvoltage circuit prevents the overvoltage from being applied to the flat panel display elements.

However, the above-mentioned prior protection circuits above are only able to prevent an overvoltage which is higher than a predetermined Zener voltage because Zener diodes were typically installed in front of the output terminal. Moreover, if several Zener diodes are connected in series so as to increase the Zener voltage, the total voltage tolerance is increased in accordance with the numbers of Zener diodes connected in series, and circuit precision suffers. Moreover it is difficult to get a proper Zener diode having a higher Zener voltage.

Also, in the prior art, power consumption by the overvoltage protecting circuit increased when an overvoltage was applied to input terminal because the flow of current through the Zener diodes was increased, with the result that life expectancy of the power supply circuit was shorter. In addition, the prior art overvoltage protection power supply circuits lack continuous protection countermeasures for protecting from overvoltages that cause a current surge which destroys the Zener diodes in the event that they are incapable of enduring the current, thereby exposing both the circuit and the display elements to the overvoltage.

SUMMARY OF THE INVENTION

The object of the present invention is to provide an overvoltage protection power supply circuit which reduces its power consumption when an overvoltage is applied to the input terminal thereof, while continuously protecting both the circuit and the flat panel display elements from overvoltage induced by the converter or applied to the input terminal. In order to achieve the above-mentioned object, an overvoltage protection power supply circuit according to the present invention comprises a voltage regulating circuit for receiving an unregulated DC voltage, and outputting a regulated DC voltage;

a DC to AC voltage converter for receiving the regulated DC voltage and converting the same to an AC voltage which is then to the flat panel display elements, a rectifying circuit to rectify the output voltage of said the convertor, an overvoltage check circuit for checking whether the rectified voltage is an overvoltage or not and a switching circuit activated by the overvoltage check circuit for controlling the voltage of an adjusting terminal of said voltage regulating circuit, whereby the output voltage from the DC to AC voltage converter is fedback to said adjusting terminal of said voltage regulating circuit via said rectifying means, said overvoltage check means and said switching means.

Other objects and advantages of the present invention will be readily appreciated as the present invention becomes better understood and reference to the following detailed description with reference to the accompanying drawings.

DETAILED DESCRIPTION OF THE PREFERRED EMBODIMENT

Figure 1:
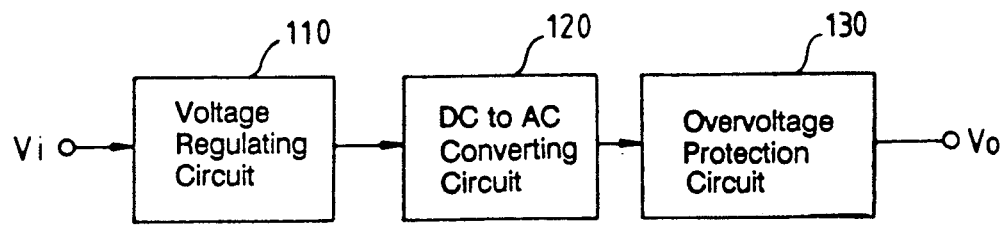
FIG. 1 is a configuration block diagram of the prior art.

FIG. 1 is a configuration block diagram of a prior art overvoltage protection power supply circuit. The prior overvoltage protection power supply circuit is made up of a voltage regulating circuit 110 for regulating an unregulated DC voltage Vi received through input terminals a DC to AC converter 120 for converting the DC output voltage of the voltage regulating circuit 110 to an AC voltage, and an overvoltage protection circuit 130 comprising a Zener diode for removing an extraordinary overvoltage from the output of the DC to AC converter.

Figure 2:
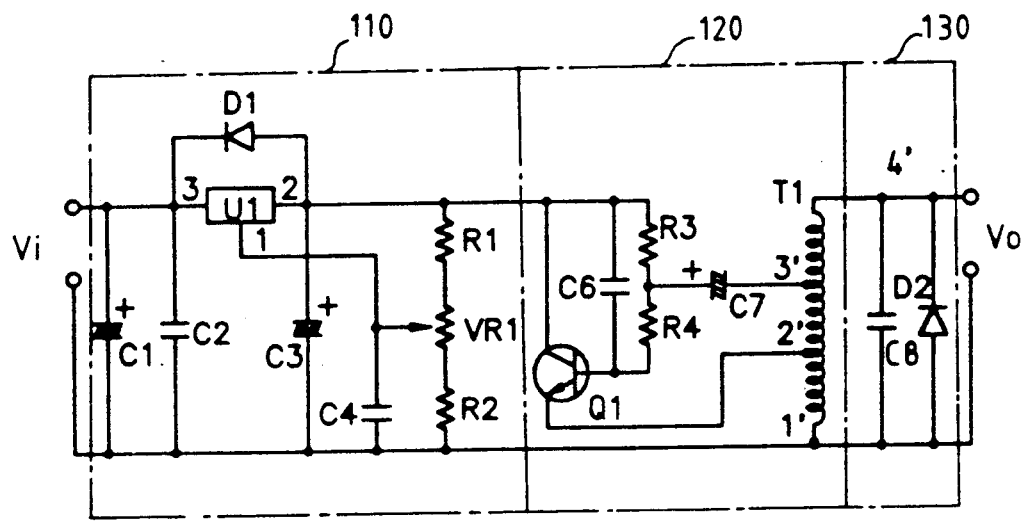
FIG. 2 is a detailed circuit diagram showing the prior art circuit of FIG. 1.

FIG. 2 is a detailed circuit diagram showing the prior art overvoltage protection power supply circuit shown in FIG. 1.

Referring to FIG. 2, the voltage regulating circuit 110 shown in FIG. 1 includes a variable voltage regulator U1 which consists of a conventional commercial IC chip to which four capacitors C1, C2, C3 and C4 are connected for voltage stabilization, and diode D1 is connected for IC chip protection, and voltage adjusting resistors R1, R2 and VR1 are connected. The DC to AC converter 120 shown in FIG. 1 consists of a semicoupling oscillating circuit which includes a transistor Q1, two capacitors C6 and C7, two resistors R3 and R4 and an inverter coil T1. The overvoltage protection circuit notated by reference numeral 130 in FIG.

1, is made up of a matching capacitor C8 and Zener diode D2 for protection, which are connected in parallel to the output terminals of the DC to AC converter 120.

Referring to FIG. 2, when an unregulated DC voltage Vi is inputted to the voltage regulator U1, the output voltage of regulator U1 may be adjusted with a variable resistor VR1. The regulated and adjusted DC voltage is then outputted from pin 2 of the voltage regulator U1. The oscillating circuit is driven by the regulated and adjusted DC voltage output from voltage regulator U1, and several hundred hertz of AC voltage is produced at output terminal 4' of the converter coil T1. In the case when the AC output voltage is higher than a predetermined level (i.e., a Zener voltage), the excess voltage over the Zener voltage is prevented from being output by means of Zener diode D2. However, since it is difficult to get a Zener diode having a proper breakdown voltage which removes the extraordinary overvoltage from the output terminal 4', several commercially available Zener diodes are usually connected in series to get the desired Zener voltage. Thus, their voltage tolerance is increased in accordance with the numbers of Zener diodes which are connected in series. Furthermore, the above-described circuit is problematic insofar as the power consumption of the inverter coil T1, the transistor Q1, and the voltage regulator U1 in the power supply circuit is increased durning the condition of overvoltage. As a result, the Zener diode's life time is substantially decreased due to the increase of current flow therethrough.

Figure 3:
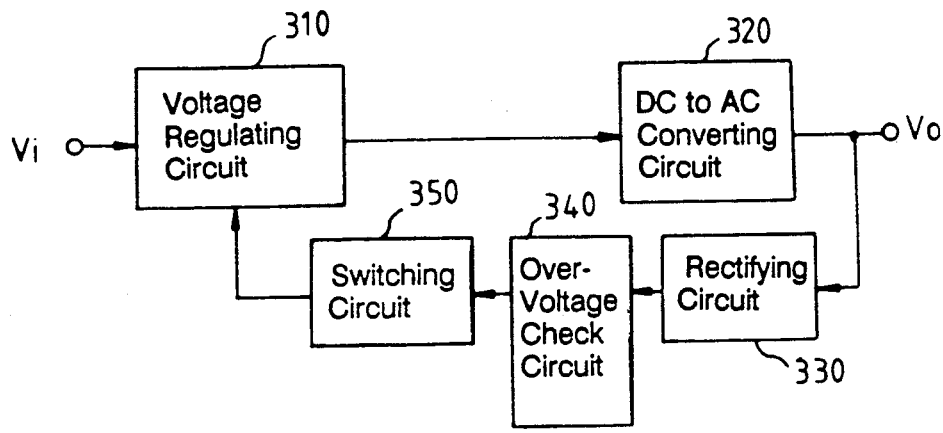
FIG. 3 is a configuration block diagram showing an overvoltage protection power supply circuit according to the present invention.

FIG. 3 shows a block diagram of an overvoltage protection power supply circuit according to the present invention which overcome the defects described above. The overvoltage protection power supply circuit comprises a voltage regulating circuit 310 for receiving an unregulated DC voltage, and outputting a regulated DC voltage and a DC to AC voltage, converter 320 for receiving the regulated DC voltage and converting the same to an AC voltage which is output from the overvoltage protection power supply circuit for driving flat panel display elements.

The voltage regulating circuit 310 and the DC to AC voltage converting circuit 320 are respectively identical to circuits 110 and 120 shown in FIG. 1. In addition, the power supply circuit of the present invention also comprises a rectifying circuit 330 to rectify the output voltage of the inverting circuit 320, an overvoltage check circuit 340 for checking a switching circuit 350 which is activated by the overvoltage check circuit 340 a switching means 350 to be switched by the checked for controlling the voltage or an adjusting terminal of the voltage regulating circuit 310.

As a result, the output voltage from the DC to AC voltage converter 320 is fedback to adjusting terminal of the voltage regulating circuit 310 via the rectifying circuit 330, the overvoltage check circuit 340, and the switching circuit 350.

Figure 4:
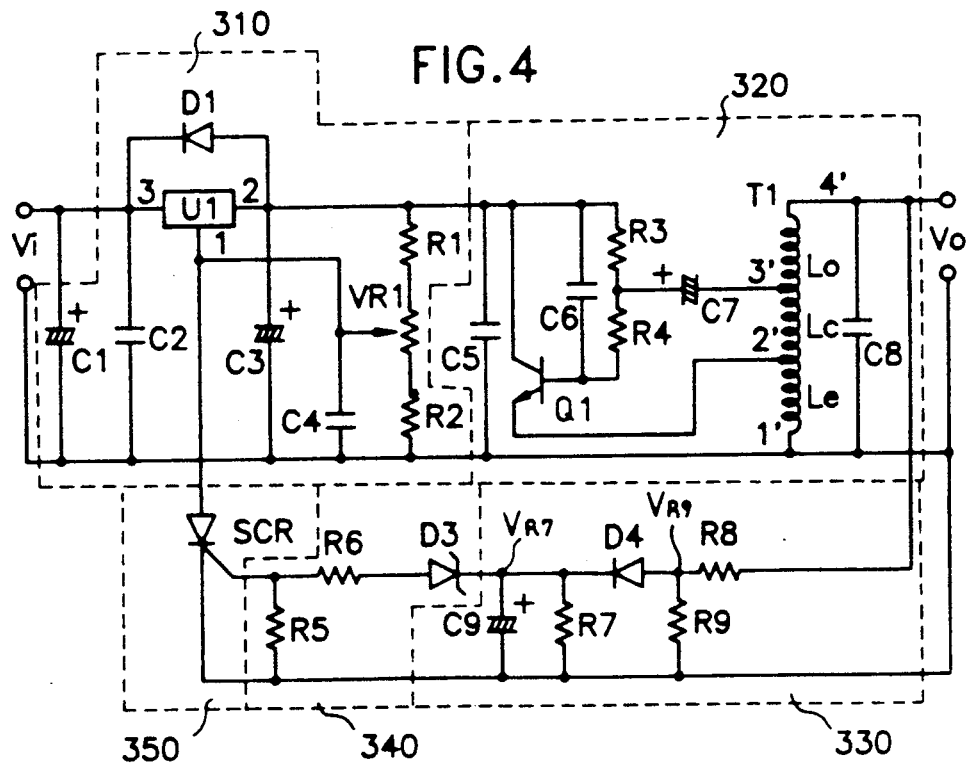
FIG. 4 is a detailed circuit diagram showing one embodiment of the circuit of FIG. 3.

FIG. 4 shows one embodiment of the overvoltage protection power supply circuit according to the present invention as shown in FIG. 3.

Referring to FIG. 4, an overvoltage protection power supply circuit is designed to eliminate the device for removing the overvoltage of FIG. 1, that is, the Zener diode D2 connected to the output terminal in the prior power supply circuit shown in FIG. 2.

According to FIGS. 3 and 4, a rectifying circuit 330 comprises a filtering capacitor C9 and a discharge resistor R7 connected in parallel with each other two voltage division resistors R8 and R9, and a rectifying diode D4 connecting resistor R7 to the junction of resistors R7 and R8. An overvoltage check circuit 340 comprises two bias resistors R5 and R6 and a Zener diode D3. A switching circuit 350 comprises a silicon controlled rectifier SCR having a gate electrode connected to the juncture of overvoltage check circuit resistors R5 and R6. The SCR also has an anode connected to the adjusting terminal of the voltage regulator U1 of voltage regulating means 310, and a cathode connected to one end of resistor R5.

The output from the DC to AC converter 320 is fedback to the voltage regulating circuit 310 through the rectifying circuit 330, the overvoltage check circuit 340 and the switching circuit 350.

In operation, when an unregulated DC voltage is applied to the input terminal as an input voltage Vi, the input voltage Vi is filtered for ripple and noise through two filtering capacitors C1 and C2, and then the filtered DC voltage is regulated by voltage regulator U1 and is output at the output terminal of pin 2 of voltage regulator U1. The output voltage of the voltage regulator U1 is in turn reduced to a certain level by voltage dividing resistors R1, VR1 and R2, and is then applied to the adjusting terminal (pin 1) of the voltage regulator U1.

When the voltage on pin 1 is high, the output voltage of pin 2 is high, whereas when the voltage of pin 1 is low, the output voltage on pin 2 is low. The Hartly Oscillator of the semicoupled type includes a coil connected between a base and a collector of a switching transistor Q1 by an upper terminal 3' and a lower terminal 1' thereof.

An intermediate tap 2' of the coil is coupled directly to an emitter of transistor Q1. The desired output voltage $V_0$ is extracted at terminal 4' of the coil portion $L_0$ extended from the upper terminal 3' of the inverter coil T1. In this case, an oscillating frequency f is given by:

$$f = \frac{1}{2\pi \sqrt{C(Le + Lc + 2M)}}$$

in which Le and Lc indicate the inductance of the inverter coil, and M indicates the mutual inductance of the coil.

An oscillating voltage is induced which depends upon the location of the intermediate tap of the coil Le and the coil Lc, and the oscillating voltage is proportional to the output voltage $V_0$.

In such a circuit as described above, when an extraordinary overvoltage, for example, Vccmax=130 VAC is applied directly to the flat panel display elements, it might damage the power supply circuit as well as the display element. Therefore, according to the present invention, an overvoltage appeared at the output terminal should be divided by means of resistors R8 and R9 into a certain voltage $V_9$ as follows:

$$V_{R9} = \frac{R9}{R8 + R9} \times V_o \text{ (here, } R8 >> R9\text{)}$$

The divided AC voltage $V_9$ is, in turn, rectified by diode D4 and transformed into a stable DC voltage by resistor R7 and capacitor C9. A DC voltage $V_7$ across the capacitor C9 is dependant on the AC voltage $V_9$. When the voltage $V_7$ is higher than the Zener voltage of Zener diode D3 due to the introduction of overvoltage, Zener diode D3 is altered from an open state into a breakdown or a closed state. As a result, DC currents flow through resistors R6 and R5, and the voltage across resistor R5 will trigger the SCR to "turn-on" or enter a conduction state. Accordingly, the voltage of pin 1 of the voltage regulator U1 becomes "0" volt, with the result that the output voltage of pin 2 of the voltage regulator U1 becomes "0" volt. The Hartly oscillator is not operated, with the result that the output voltage $V_0$ is "0" volt. Therefore, because the SCR is continuously turned on, the output voltage $V_0$ holds an "0" volt state until the cause of the overvoltage condition is removed. Here, resistor R7 is a discharge resistor, and capacitor C9 is used for removal of any surge voltage to prevent the Silicon Controlled Rectifier SCR from malfunctioning when an instantaneous noise impulse is input thereto.

As described above, an overvoltage protection power supply circuit according to the present invention disconnects an overvoltage even if an instantaneous overvoltage is applied to the input terminal, and at the same time, the overvoltage is prevented from reaching the flat panel display elements even if the overvoltage is generated over a period of time. In addition, the error of the protection threshold is reduced.

Obviously, various modifications and variations of the present invention can be made in the light of above teachings. It is therefore to be understood that, within the scope of appended claims the present invention may be practiced otherwise than as specifically described.

What is claimed is:

1. An overvoltage protection power supply circuit comprising:
    voltage regulating means for receiving an unregulated DC voltage and outputting a regulated DC voltage;
    DC to AC voltage converting means coupled to said voltage regulating means for receiving said regulated DC voltage and converting said regulated DC voltage to an AC voltage;
    means coupled to said converting means for outputting said AC voltage;
    rectifying means coupled to said converting means for rectifying the AC voltage output from said converting means to obtain a rectified feedback voltage, said rectifying means comprising:
    a voltage divider,
    a rectifying diode coupled to said voltage divider,
    a filter capacitor coupled to said rectifying diode for removing any surge voltage, and
    a discharge resistor coupled in parallel with said filter capacitor;
    means coupled to said rectifying means for determining whether the rectified feedback voltage exceeds a predetermined voltage; and
    switching means coupled to said determining means and said voltage regulating means for causing said voltage regulating means to disable said regulated DC output when said rectified feedback voltage exceeds said predetermined level.

2. An overvoltage protection power supply circuit according to claim 1, wherein said switching means comprises a silicon controlled rectifier having a gate electrode and a cathode electrode both connected to said determining means, and an anode electrode connected to said voltage regulating means.

3. An overvoltage protection power supply circuit comprising:
    voltage regulating means for receiving an unregulated DC voltage and outputting a regulated DC voltage;
    DC to AC voltage converting means coupled to said voltage regulating means for receiving said regulated DC voltage and converting said regulated DC voltage to an AC voltage;
    means coupled to said converting means for outputting said AC voltage;
    rectifying means coupled to said converting means for rectifying the AC voltage output from said converting means to obtain a rectified feedback voltage;
    means coupled to said rectifying means for determining whether the rectified feedback voltage exceeds a predetermined voltage, said deterermining means comprising a Zener diode, and two bias resistors connected in series with said Zener diode; and
    switching means coupled to said determining means and said voltage regulating means for causing said voltage regulating means to disable said regulated DC output when said rectified feedback voltage exceeds said predetermined level.

4. An overvoltage protection power supply circuit according to claim 3 wherein said switching means comprises a silicon controlled rectifier having a gate electrode and a cathode electrode both connected to said determining means, and an anode electrode connected to said voltage regulating means.

* * * * *